US006467914B1

(12) United States Patent
Cohen et al.

(10) Patent No.: US 6,467,914 B1
(45) Date of Patent: Oct. 22, 2002

(54) NIGHT VISION GOGGLES COMPATIBLE WITH FULL COLOR DISPLAY

(75) Inventors: Richard L. Cohen, Toms River, NJ (US); Craig R. Scoughton, Sussex, NJ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 06/786,269

(22) Filed: Oct. 10, 1985

(51) Int. Cl.[7] .......................... G02B 27/00; G08B 5/00; H01J 40/14
(52) U.S. Cl. .............................. 359/601; 250/214 LA; 340/815.41; 340/945; 345/8; 359/229; 359/635
(58) Field of Search .......................... 340/705, 815.41, 340/945; 350/174; 343/5 CD; 359/634, 229, 601; 345/8; 250/214 LA

(56) References Cited

U.S. PATENT DOCUMENTS

| | | | |
|---|---|---|---|
| 2,308,704 A | * | 1/1943 | MacNeil |
| 2,540,943 A | | 2/1951 | Hales |
| 2,955,231 A | | 10/1960 | Aiken |
| 3,245,315 A | * | 4/1966 | Marks et al. |
| 3,373,506 A | * | 3/1968 | Davidoff |
| 3,449,583 A | * | 6/1969 | Eden |
| 3,479,454 A | | 11/1969 | Wolff |
| 3,517,122 A | | 6/1970 | Owen |
| 3,602,573 A | * | 8/1971 | Kermode ..................... 350/174 |
| 3,617,997 A | * | 11/1971 | Maass et al. ............. 343/5 CD |
| 3,704,061 A | * | 11/1972 | Travis ......................... 350/174 |
| 3,812,526 A | * | 5/1974 | Tan |
| 3,840,731 A | * | 10/1974 | Saufferer |
| 3,955,190 A | * | 5/1976 | Teraishi |
| D253,177 S | * | 10/1979 | Litman |
| 4,170,772 A | | 10/1979 | Bly |
| 4,190,832 A | * | 2/1980 | Mohler ....................... 340/705 |
| 4,201,450 A | * | 5/1980 | Trapani |

(List continued on next page.)

FOREIGN PATENT DOCUMENTS

| | | | | |
|---|---|---|---|---|
| DE | 33 13899 A1 | 10/1984 | ........... | G02B/23/12 |
| EP | 9332 | * 4/1980 | ................. | 350/174 |
| GB | 1605139 | 1/1982 | | |
| WO | WO 9943547 A | 9/1999 | ........... | B64D/47/02 |

OTHER PUBLICATIONS

Pave Low III, Interior Lighting Reconfiguration for Night Lighting and Night Vision Goggle Compatibility, H. L. Task; L.L. Griffin, Human Engineering Division, Aerospace Medical Research Laboratory, Wright–Patterson, AFB, Ohio, pp. 106–116.

The Night Vision Goggle Compatible Helicopter Cockpit, Dr. H.–D.V. Boehm, Messerschmitt–Beolkow–Blohm GmbH Munich, Germany, Tenth European Rotocraft Forum, Aug. 28–31, 1984.—The Hauge, The Netherlands.

North Atlantic Treaty Organization, Military Agency for Standardization (MAS), Standardization Agreement, Night Vision Goggle Lighting Compatibility Design Criteria, Oct. 16, 1985, M. Korkolis.

(List continued on next page.)

Primary Examiner—Stephen C. Buczinski
(74) Attorney, Agent, or Firm—Loria B. Yeadon

(57) ABSTRACT

An ANVIS aid, such as an ANVIS goggles set, with a first optical filter is described. A second optical filter blocking light in an opposite sense from the first optical filter is placed at a color display, which may otherwise present offending light that would interfere with the ANVIS.

3 Claims, 2 Drawing Sheets

U.S. PATENT DOCUMENTS

| | | | |
|---|---|---|---|
| 4,229,066 A | | 10/1980 | Rancourt et al. ............ 350/1.6 |
| 4,374,325 A | * | 2/1983 | Howorth |
| 4,376,889 A | | 3/1983 | Swift ......................... 250/213 |
| 4,425,600 A | | 1/1984 | Barnhart ...................... 362/84 |
| 4,449,787 A | | 5/1984 | Burbo et al. ................ 350/538 |
| 4,463,252 A | * | 7/1984 | Brennan et al. |
| 4,473,277 A | * | 9/1984 | Brown |
| 4,488,786 A | * | 12/1984 | Caramel |
| 4,495,520 A | | 1/1985 | Kravitz et al. |
| 4,515,442 A | | 5/1985 | Aron .......................... 350/397 |
| 4,560,233 A | * | 12/1985 | Banbury ..................... 350/174 |
| 5,175,651 A | | 12/1992 | Marron et al. .............. 359/721 |
| 5,268,788 A | | 12/1993 | Fox et al. ................... 359/490 |
| 5,438,452 A | | 8/1995 | Gruber ....................... 359/511 |
| 5,617,080 A | | 4/1997 | Morich ................. 340/815.57 |

OTHER PUBLICATIONS

North Atlantic Treaty Organization, Advisory Group for Aerospace Research and Development (Organisation Du Traite De L'Atlantique Nord); AGARD Conference Proceedings No. 379, Visual Protection and Enhancement, pp. 5–1–5–11.

C. E. Rash, et al. "Compatibility of Aircraft Cockpit Lighting and Image Intensification Night Imaging Systems", Optical Engineering, US, SOC. of Photo–Optical Instrumentation Engineers, Bellingham, vol. 29, No. 8, Aug. 1, 1990, pp. 863–869, XP000141200, ISSN: 0091–3286.

* cited by examiner

NIGHT VISION GOGGLES COMPATIBLE WITH FULL COLOR DISPLAY

CROSS-REFERENCE TO RELATED APPLICATIONS

Reference is made to Cohen, et al. application Ser. No. 06/786,268, filed Oct. 10, 1985, now U.S. Pat. No. 6,142,637, issued Nov. 7, 2000, and Cohen et. al. application Ser. No. 09/632,760, now abandoned, which are hereby incorporated by reference.

FEDERALLY SPONSORED RESEARCH OR DEVELOPMENT

Not Applicable.

BACKGROUND OF THE INVENTION

1. Technical Field

This invention relates to electronic passive night vision aids and to a system for operating such night vision aids in conjunction with a local display such as a cockpit display. More particularly, the invention relates to an electronic night vision aid which amplifies light and may be used with a local display. A typical local display used with this invention is a head down display (HDD) used to provide instrumentation and other data to the viewer. It is intended that the local display may be viewed either with or without the night vision aid in use.

2. Background Art

Passive night vision aids such as ambient or aviator's night vision (ANVIS) goggles are becoming popular in the military aircraft cockpit setting. The increased popularity of such night vision goggles and other passive night vision aids creates unique problems with illumination of cockpit displays. These passive night vision aids operate by amplifying available light, particularly in the longer wavelengths of visible light. In the upper infrared ranges, illumination from cockpit display sources overwhelms sensor elements which are used in such night vision aids, and thereby interrupts the night vision aid for up to several minutes.

It is important that the display indicators remain illuminated, not only for the benefit of the crewmen who are not wearing night vision aids, but also because those using the goggles will typically view the instruments by looking under the goggles.

In an attempt to alleviate this problem of cockpit displays overwhelming ANVIS devices, attempts have been made to filter the light from these display sources to restrict illumination to wavelengths not normally received by the night vision goggles. Filtration of the objectionable light must be very efficient because small amounts of light within the active frequency range of the night vision aid will overwhelm the aid. This becomes difficult due to the close proximity of the night vision aid to the illuminated indicators.

Conventional passive night vision aids are sensitive to light having wavelengths of 580 nanometer (nM) or longer. This means that illumination of displays at shorter wavelengths (frequencies above the frequency range of the passive night vision aids) will not substantially interfere with the night vision aids and will facilitate the use of such night vision aids. The selective filtration of light according to wavelength generally prevents the use of full color displays. This is because frequencies at the lower end of the visible spectrum overlap with those frequencies which are received by the night vision goggles.

It is accordingly desired that a night vision aid such as ANVIS goggles be operable while a full color display is presented in the vicinity of the goggles. In particular, it is desired to operate ANVIS goggles in a cockpit or similar environment in which a full color display is illuminated. It is therefore desired to prevent light which originates at the full color display from overwhelming the night vision aid.

SUMMARY OF THE INVENTION

In accordance with the present invention, an ANVIS aid, such as an ANVIS goggles set, is provided with an optical filter. A second optical filter blocking light in an opposite sense from the first optical filter is placed over displays, which may otherwise present light that would interfere with the ANVIS.

Advantages include increased flexibility in use of ANVIS devices and ability to operate full color displays when ANVIS devices are being used.

DETAILED DESCRIPTION OF THE INVENTION

Mode(s) for Carrying Out the Invention

Figure 1:
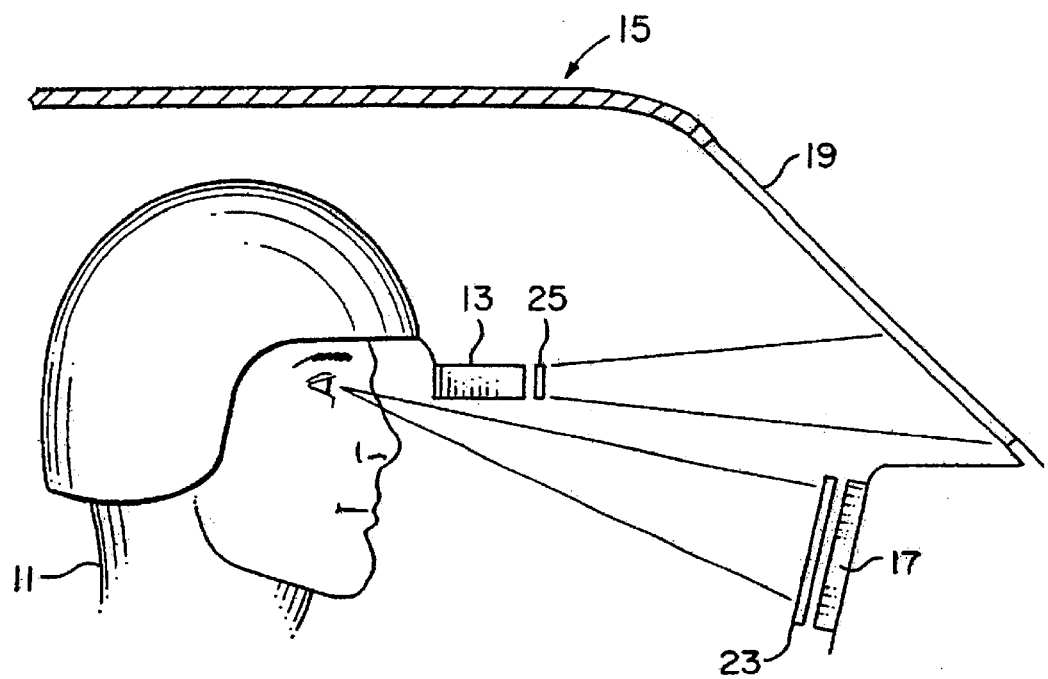
FIG. 1 shows an arrangement by which offending light is blocked from entering a night vision goggles device by the use of filters on the night vision goggles device and a head down display.

FIG. 1 shows a viewer such as a crewmember 11 of an aircraft or other vehicle. The crewmember 11 is provided with a night vision aid device such as an ANVIS goggles set 13 within an aircraft cockpit 15. A local color display 17 which is preferably a head down display (HDD) is also viewable by the crewmember 11, although the crewmember 11 would tend to avoid looking through the ANVIS 13 while viewing the color local display 17. Thus, the ANVIS 13 is intended for use when viewing objects outside of the cockpit 15 through a windshield 19 of the cockpit, whereas the local display 17 is intended to be viewable without the aid of the ANVIS 13.

While the preferred embodiment is described in conjunction with a specific example of a crewmember 11 in an aircraft cockpit 15, it is understood that the present invention can be used by other viewers in association with environments other than an aircraft cockpit 15. Furthermore, it is anticipated that in many situations, including an aircraft, multiple crew members may be present and the ANVIS 13 may be utilized by different crew members.

The cockpit has several local displays such as color display 17, which are illuminated so as to be clearly visible without the use of the ANVIS 13. While nighttime illumination of the display 17 is likely to be reduced under the lighting conditions in which the ANVIS 13 is used, the localized display 17 may still overwhelm the ANVIS 13. This can occur as a result of stray light from the display 17 such as reflected light entering the ANVIS 13, or from the ANVIS 13 momentarily aligning with the display 17. If this happens, the ANVIS 13 may go to full illumination, a situation which is not only unpleasant for the crewmember 11, but which also temporarily impairs his vision, particularly with respect to dimly lit objects. A further effect of the ANVIS 13 being overwhelmed is that photooptical circuit elements within the ANVIS 13 tend to maintain some of the effects of bright illumination for short periods of time. This phenomenon is akin to "blooming" which also occurs when portions of photoelectric elements are brightly illuminated.

In order to avoid the ANVIS 13 being overwhelmed by light from the local color display 17, it may be necessary to filter light from the local light source 50 of the display 17 before that light reaches the ANVIS 13. If the local display 17 is a full color display, it is necessary to use techniques other than color selection to filter light entering the ANVIS 13.

Located in front of the local display 17 is a first optical filter 23, such as a polarizer or a notch filter. A second optical filter 25, such as a polarizer of an opposite sense or a filter that blocks light passed by the notch filter, is placed in front of the ANVIS 13 in a way such that light entering the ANVIS 13 must encounter the second optical filter 25. As a consequence of the two optical filters 23, 25 being of opposite senses from each other, offending light transmitted from the local color display 17 is blocked from entering the ANVIS 13.

In one embodiment, the polarizers 23, 25 are circular polarizers, with one of the polarizers 23, 25 being a right hand polarizer, while the other polarizer 23, 25 is a left hand polarizer. While there is no preference for which polarizer 23 or 25 is selected as having the left hand polarization, it may be that disparate devices such as aircraft exterior lights may use polarizers of a certain sense, thereby making it advantageous to select the directions of polarization of the polarizers 23, 25 accordingly.

In a second embodiment, the first and second optical filters 23, 25 filter light based on specific wavelengths, with one of the filters 23, 25 being a notch filter, while the other filter 23, 25 substantially blocks light of a predetermined red color band $\lambda_1$ passed by the notch filter.

It is also possible to provide linear polarizer filters as the first and second optical filters 23 and 25, although if the crewmember 11 tilts his head and the ANVIS 13 sideways, the combined effects of filters 23 and 25 are significantly diminished.

The conditions under which the ANVIS 13 is used, as stated previously, are such that maximum brightness or illumination of local display 17 is not required. For this reason, filter 23 has little effect on the quality of the image provided by the local display 17. It is, of course, recognized that filter 25 has some effect on the image provided by the ANVIS 13. It is anticipated that the use of a polarizer as filter 25 has other beneficial effects in viewing the outside world, for example, by reducing glare from the windshield 19.

Figure 2:
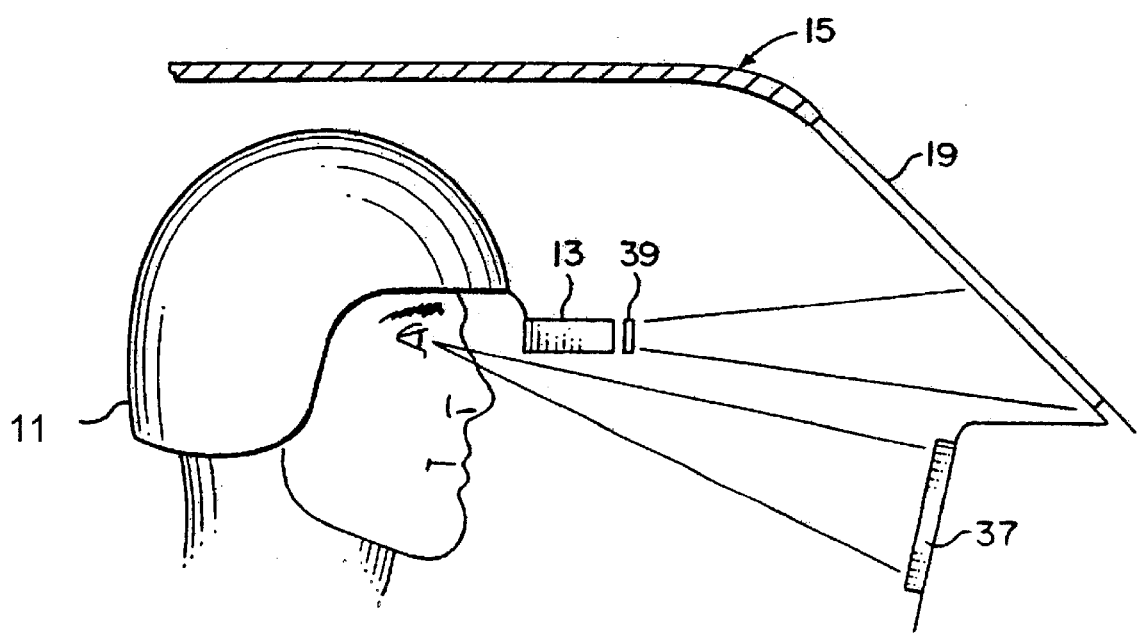
FIG. 2 shows an arrangement by which offending light is blocked from entering a night vision goggles device by the use of a filter on the night vision goggles device and a plurality of filters at a heads down display.

FIG. 2 shows an arrangement by which light originated from a local light source 50, of a local color display 37, is blocked by a light blocking device 39.

In one embodiment, the light blocking device 39 is a liquid crystal filter, in which a liquid nematic crystal substrate is aligned by electrical charges. The alignment of the liquid substance crystal causes light to be blocked or unblocked from passage through the liquid crystal substance. This enables the liquid crystal shutter to rapidly block and unblock light admitted to the ANVIS 13. If the local display 37 is caused to have a blanking time, the blanking time can be synchronized with the operation of the liquid crystal shutter 39 in such a way that when the liquid crystal shutter 39 admits light, the local display 37 is blanked. In the case of the display being a full color cathode ray tube display, the display 37 can be blanked in order to display a complete frame when the shutter 39 is closed and not illuminate during the blanking period. During the blanking period, the liquid crystal shutter 39 is caused to admit light.

In another embodiment, the light blocking device 39 is a shutter. For example, a PLZT shutter may be used as light blocking device 39 in order to provide a fast response time.

The technique of using three primary display colors to generate a full color image on a cathode ray tube allows a much greater time period for admitting light to the ANVIS 13 while still providing a high quality image to a local display 37 which uses a cathode ray tube. If the ANVIS 13 is sensitive only to colors at lower wavelengths (red), then only the red color from the local display 37 need be blanked. This allows the other primary colors generated on the local display 37 to be displayed in a normal manner.

If the different colors displayed by the local display 37 are sequentially scanned, then any one color would be blanked during the time when a frame of the other colors are being scanned. If three primary colors are used on the local display 37, then the light blocking device 39 need only be closed during approximately one third of the time of operation. In cases where the colors on the local display are simultaneously scanned, it is still possible to blank only the offending color during a portion of the time of display.

Since the need for light intensity of the display 37 during the use of the ANVIS is low, it is anticipated that the non-offending colors will be reduced in intensity. The offending color may then be intermittently blanked and, when not blanked, transmitted at a high enough intensity to compensate for the blanking. This reduces flicker which would occur on the local display by causing such flicker to be predominate in only one color. Since the other colors are being transmitted at a normal rate, the normal scanning characteristics of images in the non-offending colors is retained, while the crewmember 11 is able to perceive a full color image on the local display 37. This allows the crewmember 11 to perceive spatial relationships in the image with reduced flicker.

Figure 3:
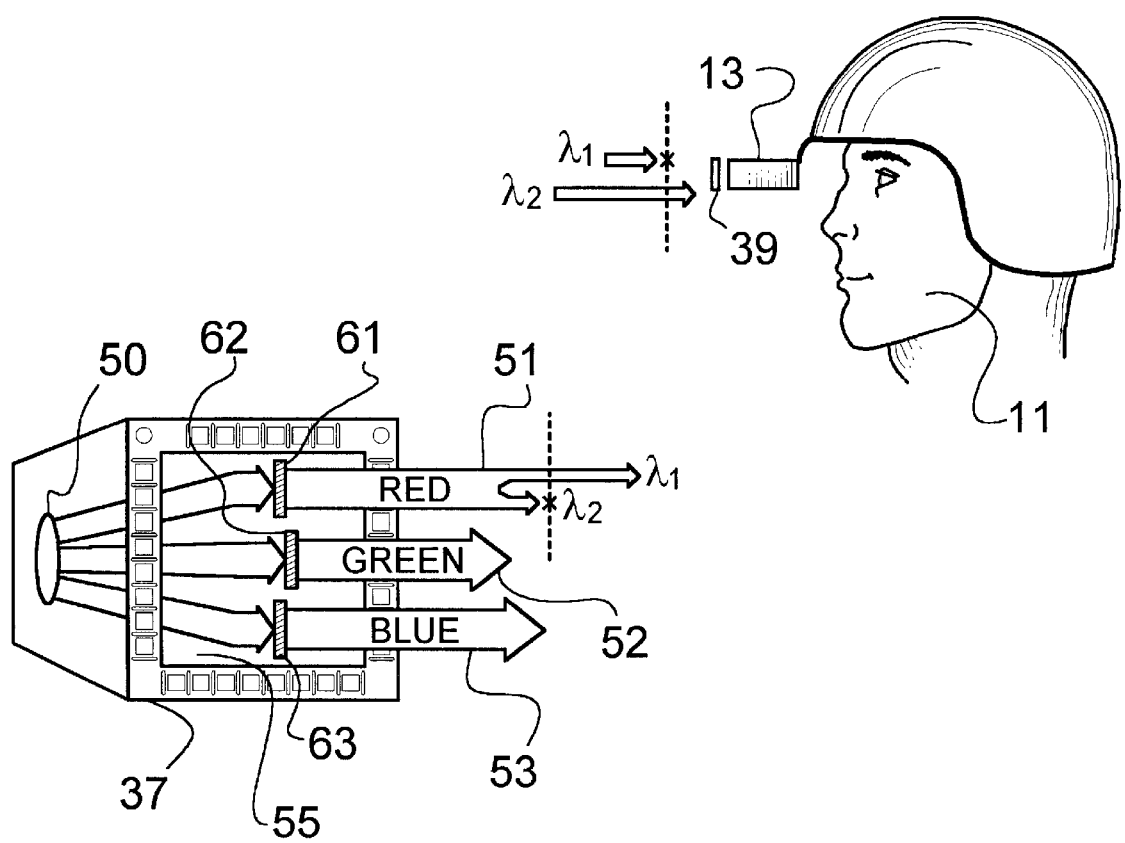
FIG. 3 shows an arrangement for selective color filtration for a heads down display in accordance with one embodiment of this invention.

FIG. 3 shows an arrangement in which the local source of light 50 comprises, red 51, green 52, and blue 53 color bands sourced from monochromatic display transducers, such as for example three monochromatic cathode ray tubes (CRTs) which are used to provide a color display. Such a color display could be used as the local color display 37 shown in FIG. 2. Each color band 51–53 provides a monochromatic image in one primary color for the full color display, which appears on a front screen 55 as a combined full color image.

The use of the multiple monochromatic display transducers, such as CRTs, permits each of the different color bands 51–53 to be filtered in different manners. For example, if the first monochromatic display transducer, such as a CRT providing a red color band 51, projects an image in the red spectrum, a filter 61, such as a bandpass filter, may be used with CRT 51 so that only light within a narrow range of frequencies $\lambda_1$ may be transmitted from the local color display 37. The other monochromatic display transducers, such as for example, a CRT providing a green color band 52 and a CRT providing a blue color band 53, may be provided with high pass (or low pass should that be appropriate) filters 62 and 63 which block all objectionable light, including light within the range admitted by filter 61. If the output color bands 51–53, of any of the monochromatic display transducers, such as CRTs include light frequencies that would cause interference with the ANVIS 13, the local color display 37 could also include a filter with a bandpass characteristic.

In the case of the local display 37 using separate cathode ray tubes 51–53 or other display transducers, it is possible to more easily filter offending colors from reaching the ANVIS 13. In this arrangement, the display unit of the offending color is filtered with a narrow band bandpass filter so that light transmitted by the display unit is only within a very narrow color band $\lambda_1$ and light of the offending color not within the narrow color band $\lambda_2$ is blocked. In the case of CRT displays, the narrow color band may be defined for example as the band at which most light is transmitted by a phosphor coating on the CRT, typically a five to twenty nanometer band.

Light blocking device 39 on the ANVIS may therefore be a notch filter for blocking light corresponding to the narrow color band $\lambda_1$. This provides a minimum of filtration of total light input to the ANVIS 13, thereby permitting the ANVIS to operate near maximum efficiency. Likewise, light from the local display 37 is also transmitted at near maximum efficiency. The most offending color (usually red) can further be blanked as described.

Alternate Embodiments

While specific configurations of the local display 17 or 37 have been described, it is understood that the present invention can be applied to a wide variety of display and vision aid devices. For example, the offending light which is blocked from admission to the ANVIS 13 may be interior ambient cockpit lighting, rather than the illumination of the display. For these reasons, the present invention should be read as limited only by the claims.

What is claimed is:

1. A display system for use in association with a light amplifying passive night vision aid and a local color display including a local source of light, comprising:

(a) a first optical filter that filters light from the local color display, wherein said first optical filter is a notch filter that passes light comprising predetermined color bands including a predetermined red color band and that substantially blocks light associated with color bands other than said predetermined color bands; and (b) a second optical filter that filters light at the night vision aid, wherein said second optical filter substantially blocks light of at least said predetermined red color band.

2. A display system for use in association with a light amplifying passive night vision aid and a local color display including a local source of light having blue, red, and green color bands, comprising:

(a) a plurality of filters at the local color display including
       (1) a first filter for filtering the blue color band of the local source of light;
       (2) a second filter for filtering the green color band of the local source of light; and
       (3) a third filter for filtering the red color band of the local source of light and passing a narrowband of the red color band; and (b) a fourth filter which filters light at the night vision aid, said fourth filter cooperating with said plurality of filters to substantially block at least said narrowband of the red color band from being admitted to the night vision aid.

3. The display system of claim 2 wherein said narrowband of the red color band is substantially five to twenty nanometers wide.

* * * * *

UNITED STATES PATENT AND TRADEMARK OFFICE
Certificate

Patent No. 6,467,914 B1                                          Patented: October 22, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert L. Cohen, Delray Beach, FL.

Signed and Sealed this Eighteenth Day of October 2005.

THOMAS H. TARCZA
*Supervisory Patent Examiner*
Art Unit 3662

UNITED STATES PATENT AND TRADEMARK OFFICE
Certificate

Patent No. 6,467,914 B1                                                       Patented: October 22, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Richard L. Cohen, Delray Beach, FL.

Signed and Sealed this Twentieth Day of December 2005.

<div style="text-align:right">

THOMAS H. TARCZA
*Supervisory Patent Examiner*
Art Unit 3662

</div>